United States Patent [19]
Page

[11] 3,908,636
[45] Sept. 30, 1975

[54] PORTABLE PULSE SENSOR

[76] Inventor: Robert E. Page, 3427 Dumas St., San Diego, Calif. 92106

[22] Filed: Feb. 15, 1974

[21] Appl. No.: 442,705

[52] U.S. Cl. .................... 128/2.05 T; 128/2.05 P
[51] Int. Cl.² ........................................ A61B 5/02
[58] Field of Search....... 128/2.05 A, 2.05 E, 2.05 P, 128/2.05 Q, 2.05 R, 2.05 S, 2.05 T; 179/1 UW, 110 A

[56] References Cited
UNITED STATES PATENTS

| | | | |
|---|---|---|---|
| 2,918,054 | 12/1959 | Goolkasian.................... | 128/2.05 T |
| 3,229,685 | 1/1960 | Ringkamp et al.............. | 128/2.05 A |
| 3,556,084 | 1/1971 | Budde ............................ | 128/2.05 P |
| 3,562,491 | 2/1971 | Mullen, Jr...................... | 179/110 A |
| 3,651,798 | 3/1972 | Egli et al. ...................... | 128/2.05 P |

FOREIGN PATENTS OR APPLICATIONS

| | | | |
|---|---|---|---|
| 1,466,900 | 5/1969 | Germany........................ | 128/2.05 R |

*Primary Examiner*—William E. Kamm
*Attorney, Agent, or Firm*—Richard S. Sciascia; Ervin F. Johnston; William T. Skeet

[57] ABSTRACT

A cardiovascular monitoring system employs a photoelectric monitoring circuit to obtain analog signals corresponding to the heartbeat of a subject. The monitoring system is housed within a small portable case which may be carried on the person of the subject. Cooperating amplification and detection circuitry are housed within the case and provide an audible tone corresponding to each pulse beat of the subject. Control switching is provided to initiate the monitoring of a subject's pulse beat and to terminate it upon placement of a finger of the subject in the monitoring test station. Additionally, the arrangement and selection of components permit waterproofing such that underwater operation is possible.

7 Claims, 3 Drawing Figures

PORTABLE PULSE SENSOR

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention pertains to the field of biomedical instrumentation. By way of further explanation, this invention pertains to the electronic instrumentation of the cardiovascular condition of a living subject. In still greater particularity, the invention provides a portable and simplified means of alerting a subject to his own cardiovascular activity. By way of further characterization, this invention pertains to a highly portable instrument which permits a subject to conveniently determine his cardiovascular activity rate without unduly interrupting his activities.

DESCRIPTION OF THE PRIOR ART

In modern times great advances have been made in biomedical instrumentation. Particularly, significant strides have been made in the instrumentation for obtaining information pertaining to the circuitry system. Such information has become the basis of the diagnosis of certain abnormal conditions as well as the termination of normal conditions in a variety of animals, including humans.

Because most of this research activity has been centered about esoteric information useful in laboratory and hospital situations, the field measurement of such vital factors as pulse rate has changed little over the years. This traditional method involves listening to the audible pulses produced by the heart of the subject by mechanically and acoustically coupling one's acoustic sensory channels to the body cavity of the subject. The apparatus permitting this acousting coupling, termed stethoscope, form the basis of the historical development of the cardiovascular instrumentation arts. While such techniques and instruments are time-proven, they nonetheless are intrusive and require a relatively quiet environment to be satisfactorily operable. Additionally, the use of this technique requires some training and experience.

It is often necessary for a subject to determine his own pulse rate. For example, a subject who has undergone heart surgery is cautioned to limit his physical activities until a complete healing has occurred. It is, therefore, important for such subjects to have an objective indication of their pulse rate uncolored by emotional and other subjective factors.

Likewise, subjects operating in environments foreign to normal terrestial activity who are supplied breathing gases must hold physical activity within certain bounds. Because of the high emotional stress and other factors encountered in these working environments, for example in outer space and underwater, it is difficult for the subject to accurately gauge his level of physical activities without an objective indication.

Thus, there has been a need for an instrument which will provide an indication of cardiovascular activity without psychological intrusion on the subject, or which would require a minimum expenditure of time by the subject. Additionally, a system which would permit a subject to monitor his own activity with a minimum of curtailment thereof has remained an unsatisfied need in the biomedical field.

SUMMARY OF THE INVENTION

The invention provides the portable pulse rate monitor which provides an audible tone corresponding to each heartbeat of the subject. A photoelectric sensor is responsive to variations produced by a light beam shining through a portion of the subject's anatomy and converts this electrical energy to audible tones. By counting the number of audible tones occurring within a fixed period of time, the subject may obtain objective information as to his level of cardiovascular activity. Selection of circuitry components and enclosure within a suitable case have rendered the circuit of the invention highly portable and effective for individual applications.

OBJECTS OF THE INVENTION

It is the primary object of this invention to provide an improved cardiovascular instrumentation device.

Another object of this invention is to provide a portable pulse sensor.

Yet another object of the present invention is to provide a pulse sensor having an audible signal.

Still another object of the present invention is to provide a portable cardiovascular instrument having an audible signal.

Still another object of the present invention is to provide a portable pulse sensing system which may be employed by a subject to determine his own pulse rate.

Yet another object of the present invention is to provide a portable cardiovascular instrumentation system having a noninvasive photoelectric input.

Yet another object of this invention is to provide a portable cardiovascular pulse detection system which is activated and deactivated by placing the system in an operative or inoperative position.

Still another object of the present invention is to provide a pulse detection system capable of personal transport to extra-terrestial work areas.

Yet another object of the present invention is to provide a portable pulse detection system using a noninvasive photoelectric input and having an audible tone indication of the pulse beat of the subject.

These and other objects of the invention will become more readily apparent from the ensuing specification when taken together with the drawings.

DESCRIPTION OF THE PREFERRED EMBODIMENT

Figure 1:
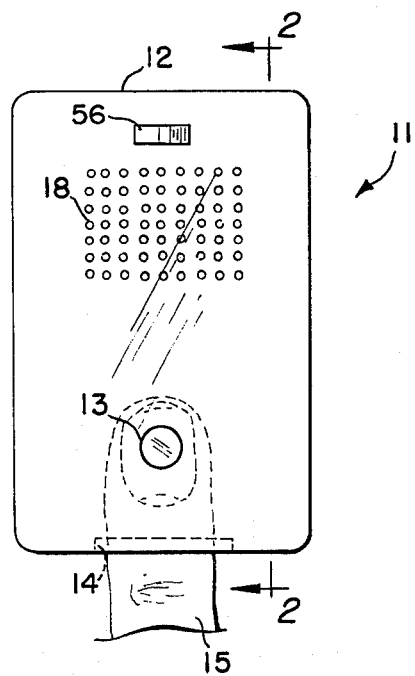
FIG. 1 is a top elevation view of the device of the invention.

Referring to FIG. 1, a cardiovascular instrument of the invention is indicated generally at 11. An opaque case 12 encloses the device and provides a mounting foundation for the various elements comprising the circuitry of the instrument. Case 12 may be of any suitable opaque plastic material or lightweight metal. In developmental models, commercially available plastic cases have proven satisfactory. A colored lens 13 is mounted on the upper surface of case 12. An aperture 14 in one end of case 12 permits the insertion of finger 15 of the subject within the interior of case 12.

Figure 2:
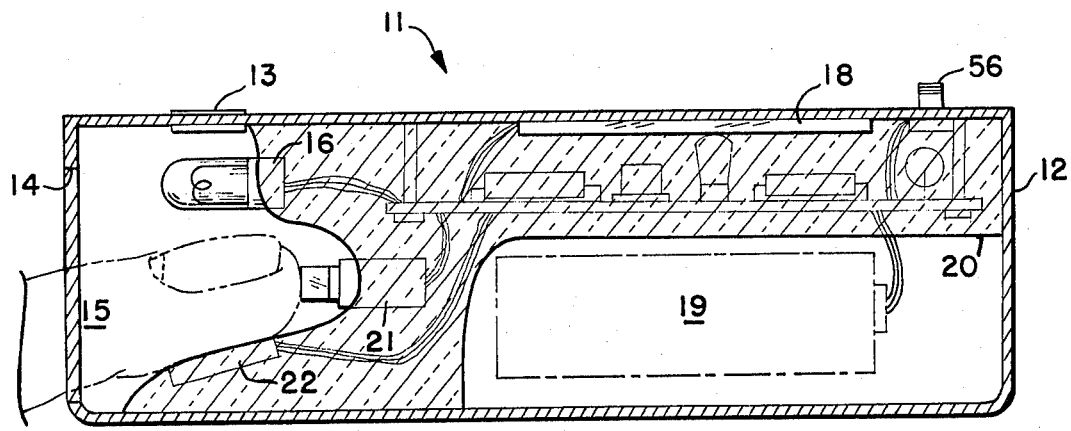
FIG. 2 is a sectional view through the device of the invention taken along lines 2—2 of FIG. 1.

Referring to FIG. 2, a sectional view taken along lines 2-2 of FIG. 1 reveals the general placement of the components within the interior of case 12. As shown, an electric lamp 16 is positioned beneath lens 13 and above a photocell 22. The positioning of lamp 16 is such as to provide an illumination of the fingernail area of the subject's finger 15. The circuit board 17 is secured to the upper surface of case 12 and mounts the various electronic components comprising the circuitry of the invention. An electroacoustic transducer 18 is also mounted to the upper surface of case 12 and occupies a position above circuit board 17. Electroacoustic transducer 18 may be a crystal type speaker element constructed of two face-shear cut crystal elements. For example, that shown in U.S. Pat. No. 3,562,451 granted to Walter W. Mullen, Jr. et al. on Feb. 9, 1971 for "Microphone and Headset for Underwater Swimmer" has proven practical in developmental models of the invention, particularly when used in underwater environments, as will be more fully discussed herein.

An electric battery 19 is positioned below circuit board 17 and is operatively connected in circuit therewith. Battery 19 may be of any suitable type, but is preferably a nine volt miniature type with snap-on terminals. Such batteries are well known in the electronics art, and offered by a variety of manufacturers. A microswitch 21 is positioned to comprise the terminal end of the test station for receiving finger 15 of the subject. It is positioned such as to be actuated by the insertion of finger 15 through aperture 14.

On the lower surface of the test station, opposite electric lamp 16, is a photocell 22. A variety of photocells for miniature applications are known on the market and choice among them will depend upon other circuit parameters. In general, however, small variable resistance photocells used in the photo industry have proven satisfactory in this application. A second switch 56 is also mounted on the upper surface of case 12 and is connected to circuit board 17. Switch 56 may optionally be provided to connect and disconnect a rate determining circuit, as will be more fully discussed herein.

The various elements shown in FIG. 2 may be held in their desired locations by a suitable clear plotting compound 20 which renders the entire unit waterproof to moderate depths where divers customarily operate and thereby provides a waterproof encapsulating mounting. Any suitable transparent potting compound may be used for this purpose. However, it should be noted that that sold under the trade name "Scotch Cast-8", manufactured by the 3-M corporation has proven satisfactory in developmental models.

Referring to FIG. 2, the circuitry comprising the invention is illustrated. As previously made clear, the pulse at the finger is detected optically as a change in brightness in the light passing through the finger caused by variations in blood volume therein. This light is provided by lamp 16 which is connected to battery 19 via a current limiting resistor 24. Lamp 16 may be of any desired type, however, in developmental models a lamp designated as type 345 has proven satisfactory. The light which passes through the finger impinges photocell 22 which may be of the CL903L type. Photocell 22 is connected to battery 19 by means of current limiting resistor 25. The pulse caused variations in resistance cause a charge to be applied to capacitor 26 which is coupled to an integrated circuit 29.

Capacitor 27 acts as a noise filter and is placed across photoresistor 22, as shown. The change in electrical flux represented by the change in voltage across capacitor 26 is coupled to integrated circuit 29 by means of by-passing resistor 28. Feedback gain control is provided by resistors 31 and 32 and are of such a value as to provide a gain of approximately 1,000 by integrated circuit 29.

The output of integrated circuit 29 is coupled via capacitor 33, to a second integrated circuit 36 which is connected to function as a differentiator. Biasing arrangements for circuit 36 are provided by resistor 34 and capacitor 35 and the differentiating feedback circuitry is comprised by capacitors 37 and resistors 38 and 39. The output of integrated circuit 36 is, resistor 41 and capacitor 42, to a transistor switch which includes transistors 43 and 44. A resistance 45 connects transistors 43 and 44 to form a transistor switch which is supplied voltage by resistance network 46 and 47 which, in turn, is stabilized by capacitor 48. Transistor switches 43 and 44, which may be types 2N2222 and 2N2907 respectively, operate a pulsed audio oscillator which is comprised by a third integrated circuit 51.

Integrated circuit 51 is connected as an oscillator by feedback resistance 52 and capacitor 53. These components are chosen so as to provide the desired audio tone to be monitored. Although 1,000 cycles have proven satisfactory in developmental models, other frequencies may be chosen if desired. For example, if the device is to be used primarily by in an underwater invironment personnel, the audio frequency may be chosen which could be monitored by passive search sonars such that, in emergency situations, the pulse detector may be used in emergency homing beacons.

The output of integrated circuit 51 is taken from load resistor 54 by means of switch 56 and coupled to crystal transducer 18. If desired, switch 56 may be thrown to the nonillustrated position and connect a rate sensor circuit 55 in the pulse monitoring circuit.

Rate sensor circuit 55 is simply a conventional time controlled gate circuit which may be left open for a predetermined length of time. The length of time that the gate is left open is chosen such that the number of pulse counts heard during that interval may be multiplied to obtain a conventional pulse rate. Thus, if the period which gate 55 may be left open is 6 seconds, the pulse count multiplier would be 10. Such a large multiplier, while satisfactory in some instances, does not provide an accurate pulse count. Of course, pulse rate sensor 55 may be open for a period of 60 seconds, in which case the pulse count would be the commonly accepted pulse rate. However, such long periods have proven unsatisfactory, in that they are intrusive on the activities of the subject and permit a loss of count during such a long interval. A 15 second interval has proven satisfactory for most circumstances, in which case the multiplier is four and such a computation may be easily made by a subject if an actual pulse rate is desired. Such a timing circuit is shown in "Electronic Circuit Design Handbook", 4th edition May 1971, TAB Books Blue Ridge Summit, Pa. 17214 at Page 92 and 93.

Rate sensor circuit 55 may be omitted from the device of the invention and, of course, switch 56 would also be omitted in such circumstances. Alternatively, rate sensor circuit 55 may be permanently wired into the circuit and, in such instances, switch 56 would also be dispensed with.

MODE OF OPERATION

Figure 3:
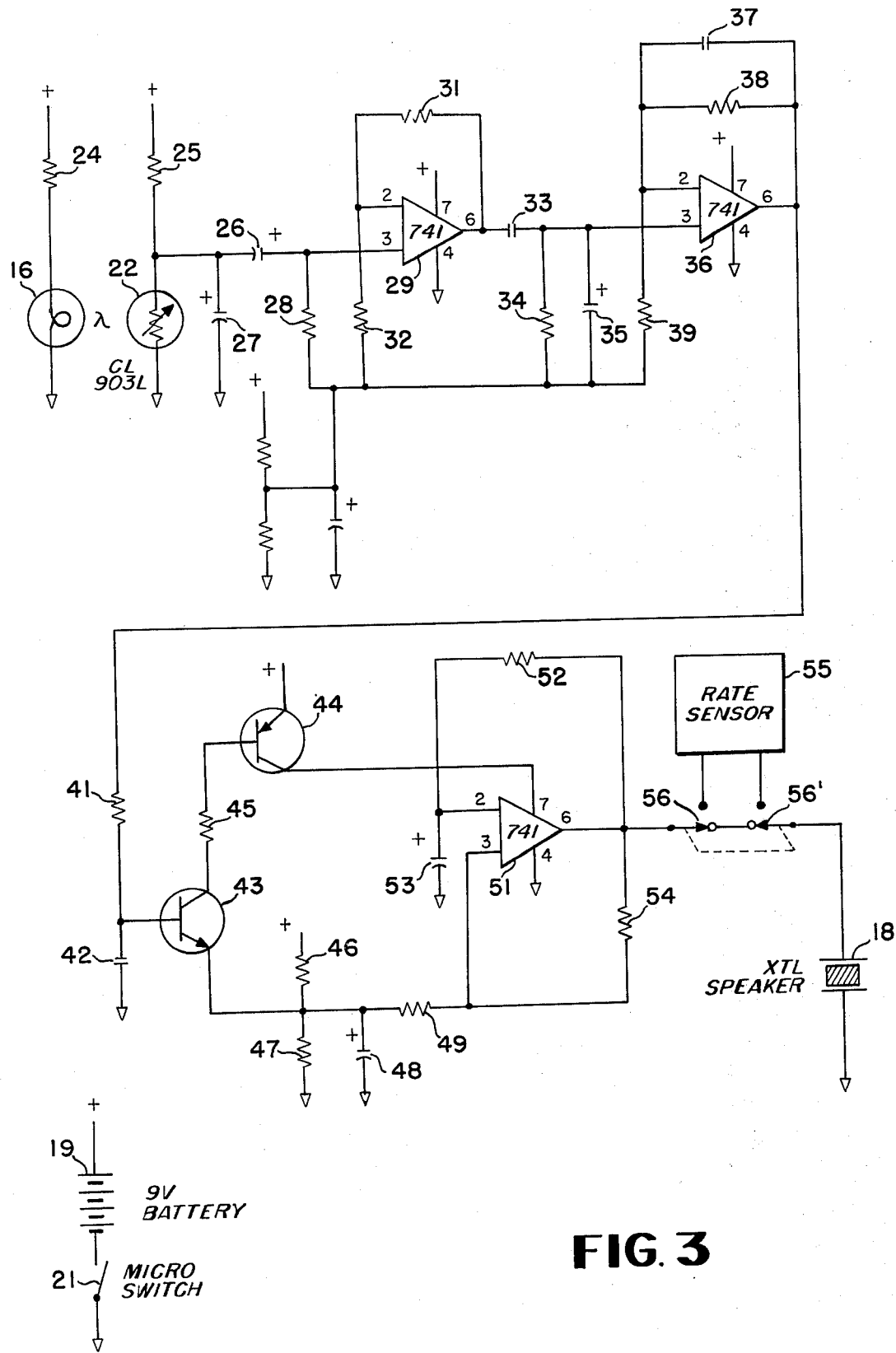
FIG. 3 is a circuit diagram of the device of the invention.

The mode of operation of the device of the invention is essentially the mode of operation of the circuit of FIG. 3. However, to initiate the circuit's operation it should be noted that the subject simply places his finger in aperture 14 sufficiently far to trip switch 21. This assures that his finger is in the test position. The tripping of switch 21 connects battery 19 in circuit with the various components to be supplied voltage. Such a power connection starts the circuit to operate and audible pulses are heard from speaker 18. In the illustrated position of switch 56, FIG. 3, audible pulses will be heard as long as finger 15 remains in the test station. However, if switch 56 is thrown to the nonillustrated position, a pulse count will start on insertion of the finger 15 in the test station to operate switch 21 and will continue for the predetermined time period for which the rate sensor gate is set. Of course, the pulse count indicates if the pulse rate has exceeded the predetermined rate so that the subject may take precautionary measures.

The foregoing description taken together with the appended claims constitute a disclosure such as to enable a person skilled in the electronics and bioinstrumentation arts and having the benefit of teachings contained herein to make and use the invention. Further, the structure herein described meets the objects of invention, and generally constitutes a meritorious advance in the art unobvious to such a skilled worker not having the benefit of these teachings.

Obviously, many modifications and variations of the present invention are possible in the light of the above teachings, and, it is therefore understood that within the scope of the disclosed inventive concept, the invention may be practiced otherwise than specifically described.

What is claimed is:

1. A cardiovascular instrument for audible detection of cardiovascular activity of a living subject comprising:
   a case adapted for portability and unobtrusive storage upon the person of the subject;
   a test station within said case for receiving an appendage of a subject under test;
   an aperture in said case positioned to communicate with said test station within said case for passing an appendage of the subject therethrough into said test station;
   a light source positioned within and effectively mounted on said case, adjacent said aperture, and on one side of said test station in a position to impinge an appendage of the subject inserted through said aperture into said test station with light energy;
   an electro-optical transducer means positioned within said test station and effectively mounted on said case opposite and in optical alignment with said light source for being occulted by a appendage of the subject when inserted through said aperture into said test station to thereby receive light which has passed through said appendage of the subject;
   circuit means attached to said case and positioned therein and electrically connected to said photoelectric transducer for receipt of electrical signals therefrom and production of larger amplitude signals having a predetermined relationship to the cardiovascular activity of the subject and including a rate determining circuit which connects said larger amplitude signals to said electroacoustic transducer during a predetermined time interval;
   electroacoustic transducer means attached to said case and positioned therewithin and electrically connected to said circuit means for producing acoustic signals in response to the larger amplitude electrical signals produced thereby;
   electrical power source means mounted to and within said case and electrically connected to said light source and said circuit means for the supply of electrical operating potentials thereto; and
   switch means attached to and positioned within said case means at the terminal end of said test station for engagement by the appendage of the subject when inserted through said aperture into said test station and electrically connected between said source of electrical power and said light source and said circuit means for establishing electrical power when the appendage of the subject is inserted and for interrupting electrical power when the appendage is withdrawn from said test station.

2. A cardiovascular instrument according to claim 1 in which case is made of an opaque material.

3. A cardiovascular instrument according to claim 1 in which said light source is an electric lamp.

4. A cardiovascular instrument according to claim 3 further including:
   a transparent lens mounted in the wall of said case in juxtaposition to said electric lamp to indicate the operative condition of the instrument.

5. A cardiovascular instrument according to claim 1 further including a second switch means connected in circuit to selectively by-pass said rate determining circuit.

6. A cardiovascular instrument according to claim 1 in which said electroacoustic transducer means is a two-element piezoelectric unit.

7. A cardiovascular instrument according to claim 6 further including a water proof mounting in which said circuit means, said electro-optical transducer, and said electroacoustic transducer are encapsulated.

* * * * *